(12) United States Patent
Liu et al.

(10) Patent No.: US 11,855,726 B2
(45) Date of Patent: Dec. 26, 2023

(54) METHOD AND APPARATUS FOR DETERMINING TRANSMIT POWER

(71) Applicant: Huawei Technologies Co., Ltd., Shenzhen (CN)

(72) Inventors: Zhe Liu, Beijing (CN); Yi Long, Beijing (CN); Wuxiao Zhou, Shanghai (CN); Zhiping Song, Shanghai (CN); Fan Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 349 days.

(21) Appl. No.: 17/214,511

(22) Filed: Mar. 26, 2021

(65) Prior Publication Data
US 2021/0218452 A1    Jul. 15, 2021

Related U.S. Application Data

(63) Continuation of application No. PCT/CN2019/108658, filed on Sep. 27, 2019.

(30) Foreign Application Priority Data

Sep. 28, 2018   (CN) .......................... 201811143504.3

(51) Int. Cl.
*H04B 7/06*        (2006.01)
*H04L 1/1812*      (2023.01)
(Continued)

(52) U.S. Cl.
CPC ......... *H04B 7/0626* (2013.01); *H04L 1/1819* (2013.01); *H04L 1/1896* (2013.01);
(Continued)

(58) Field of Classification Search
CPC ... H04B 7/0626; H04B 7/0647; H04L 1/1819; H04L 1/1896; H04L 5/0007;
(Continued)

(56) References Cited

U.S. PATENT DOCUMENTS

| 2014/0307652 | A1 | 10/2014 | Zhang et al. |
| 2016/0337178 | A1 | 11/2016 | Frenne et al. |
| 2020/0068496 | A1* | 2/2020 | Yang ..................... H04L 5/0057 |

FOREIGN PATENT DOCUMENTS

| CN | 101272370 A | 9/2008 |
| CN | 102300305 A | 12/2011 |

(Continued)

OTHER PUBLICATIONS

Kuang et al., "Adaptive Modulation and Joint Temporal Spatial Power Allocation for OSTBC MIMO Systems with Imperfect CSI," IEEE Transactions on Communications, vol. 60, No. 7, total 11 pages (Jul. 2012).

(Continued)

*Primary Examiner* — Sharmin Chowdhury
(74) *Attorney, Agent, or Firm* — Leydig, Voit & Mayer, Ltd.

(57) ABSTRACT

This application provides a method and an apparatus for determining transmit power. The method includes: A terminal device determines a first bit rate of channel state information part 1 CSI-1, where the first bit rate is a bit quantity of the CSI-1 carried on each resource element for transmitting the CSI-1; and the terminal device adjusts transmit power of a physical uplink shared channel PUSCH based on the first bit rate, where the PUSCH is used to carry the CSI-1.

13 Claims, 3 Drawing Sheets

(51) Int. Cl.
*H04L 1/1867* (2023.01)
*H04W 72/044* (2023.01)
*H04W 72/21* (2023.01)
*H04L 5/00* (2006.01)

(52) U.S. Cl.
CPC ....... *H04W 72/0473* (2013.01); *H04W 72/21* (2023.01); *H04L 5/0007* (2013.01)

(58) Field of Classification Search
CPC ... H04L 1/0003; H04L 1/0009; H04L 1/0001; H04L 5/0053; H04L 1/1671; H04L 1/1664; H04L 1/0026; H04L 1/1854; H04L 1/1861; H04L 5/0044; H04L 5/0057; H04L 1/1607; H04W 72/0473; H04W 72/21; H04W 52/146; H04W 52/267; H04W 52/325; H04W 52/24
See application file for complete search history.

(56) References Cited

FOREIGN PATENT DOCUMENTS

| | | | |
|---|---|---|---|
| CN | 102946632 | A | 2/2013 |
| CN | 103597763 | A | 2/2014 |
| CN | 103929266 | A | 7/2014 |
| CN | 104349443 | A | 2/2015 |
| CN | 104641698 | A | 5/2015 |
| CN | 106067845 | A | 11/2016 |
| CN | 106301720 | A | 1/2017 |
| EP | 3255946 | A1 | 12/2017 |
| WO | 2016163855 | A1 | 10/2016 |
| WO | 2018120107 | A1 | 7/2018 |
| WO | 2020041337 | A1 | 2/2020 |

OTHER PUBLICATIONS

Huawei.HiSilicon et al., "Discussion on UE power control," 3GPP TSG RAN WG1 Meeting #94, Gothenburg, Sweden, R1-1808070, total 3 pages, 3rd Generation Partnership Project, Valbonne, France (Aug. 20-24, 2018).

"3rd Generation Partnership Project; Technical Specification Group Radio Access Network; NR; Multiplexing and channel coding (Release 15)," 3GPP TS 38.212 V15.3.0, total 99 pages, 3rd Generation Partnership Project, Valbonne, France (Sep. 2018).

"3rd Generation Partnership Project; Technical Specification Group Radio Access Network; NR; Physical layer procedures for control (Release 15)," 3GPP TS 38.213 V15.2.0, total 99 pages, 3rd Generation Partnership Project, Valbonne, France (Jun. 2018).

"3rd Generation Partnership Project; Technical Specification Group Radio Access Network; NR; Physical layer procedures for data (Release 15)," 3GPP TS 38.214 V15.2.0, total 95 pages, 3rd Generation Partnership Project, Valbonne, France (Jun. 2018).

Huawei, HiSilicon et al., "Remaining issues on UCI multiplexing," 3GPP TSG RAN WG1 Meeting #92, Athens, Greece, R1-1801341, total 8 pages, 3rd Generation Partnership Project, Valbonne, France (Feb. 26-Mar. 2, 2018).

Zte, "Summary for AI 7.1.5 NR UL power control in non-CA aspects," 3GPP TSG RAN WG1 Meeting #94, Gothenburg, Sweden, R1-18xxxxx, total 30 pages, 3rd Generation Partnership Project, Valbonne, France (Aug. 20-24, 2018).

* cited by examiner

METHOD AND APPARATUS FOR DETERMINING TRANSMIT POWER

CROSS-REFERENCE TO RELATED APPLICATIONS

This application is a continuation of international Application No. PCT/CN2019/108658, filed on Sep. 27, 2019, which claims priority to Chinese Patent Application No. 201811143504.3, filed on Sep. 28, 2018. The disclosures of the aforementioned applications are hereby incorporated by reference in their entireties.

TECHNICAL FIELD

This application relates to the communications field, and more specifically, to a method and an apparatus for determining transmit power.

BACKGROUND

When all terminal devices in a cell arrive at a network device, to ensure that signal levels of all the terminal devices am basically maintained equal, and communication quality of all the terminal devices is maintained at a receivable level, power control is performed on the terminal devices. Power control is divided into forward power control and reverse power control. Reverse power control is further divided into open-loop power control and closed-loop power control. Closed-loop power control is further sub-divided into outer loop power control and inner loop power control.

In an actual communication process, before sending a physical uplink shared channel (PUSCH) to the network device, a terminal device needs to determine transmit power of the PUSCH based on a quantity of bits per resource element (BPRE) on the PUSCH. To be specific, when the BPRE is larger, the transmit power of the PUSCH is larger, and when the BPRE is smaller, the transmit power of the PUSCH is smaller.

However, precision of a calculation manner of the BPRE specified in an existing protocol is comparatively low which reduces accuracy of the transmit power, adjusted by the terminal device, of the PUSCH.

SUMMARY

This application provides a power control method and apparatus, to improve accuracy of determining a PUSCH by a terminal device.

According to a first aspect, a method for determining transmit power is provided, including: A terminal device determines a first bit rate of channel state information part 1 (CSI-1), where the first bit rate is a bit quantity of the CSI-1 carried on each resource element for transmitting the CSI-1; and the terminal device adjusts transmit power of a physical uplink shared channel PUSCH based on the first bit rate, where the PUSCH is used to carry the CSI-1.

In this embodiment of this application, the terminal device determines the transmit power of the PUSCH based on the first bit rate, where the first bit rate is the bit quantity of the CSI-1 carried on each resource element for transmitting the CSI-1. This helps improve accuracy of determining the transmit power of the PUSCH by the terminal device.

In a possible implementation, that a terminal device determines a first bit rate of channel state information part 1 CSI-1 includes: The terminal device determines a first code modulation symbol quantity, where the first code modulation symbol quantity is used to indicate a quantity of code modulation symbols of the CSI-1; and the terminal device determines the first bit rate based on the first code modulation symbol quantity and a bit quantity of the CSI-1 transmitted on the PUSCH.

In this embodiment of this application, the first bit rate is determined based on the first code modulation symbol quantity. This helps improve accuracy of the first bit rate.

In a possible implementation, the first code modulation symbol quantity is the quantity of code modulation symbols of the CSI-1.

In a possible implementation, the first code modulation symbol quantity is determined based on a second code modulation symbol quantity, and the second code modulation symbol quantity is a preset quantity of code modulation symbols of a HARQ-ACK.

In this embodiment of this application, the first code modulation symbol quantity is directly determined based on the second code modulation symbol quantity. The terminal device may not consider a quantity of code modulation symbols actually occupied by an ACK/a NACK. This simplifies a process in which the terminal device determines the first code modulation symbol quantity, and avoids a case in which the terminal device is unable to calculate transmit power in time because the terminal device cannot learn of the quantity of code modulation symbols actually occupied by the ACK/NACK.

In a possible implementation, the first code modulation symbol quantity is determined based on the second code modulation symbol quantity and a quantity of first resource elements, and the quantity of first resource elements is a quantity of resource elements occupied by uplink control information in all OFDM symbols occupied by the PUSCH.

The uplink control information may include aperiodic CSI and uplink control information that originally needs to be transmitted by using a PUCCH. Alternatively, the uplink control information may include uplink control information that originally needs to be transmitted by using a PUCCH, and the uplink control information that originally needs to be transmitted by using the PUCCH includes periodic CSI.

In a possible implementation, the method further includes: The terminal device determines a first receiving moment for receiving first indication information, where the first indication information is used to indicate a quantity of code modulation symbols occupied for transmitting an ACK/a NACK on the PUSCH; the terminal device determines a first time length between the first receiving moment and the first sending moment, where the first sending moment is a sending moment of the PUSCH, or a sending moment of a PUCCH that at least partially overlaps the PUSCH in time domain; and if the first time length is greater than a first preset time length, the terminal device determines the first code modulation symbol quantity based on the first indication information.

In this embodiment of this application, if the first time length is greater than the first preset time length, the terminal device may determine the first code modulation symbol quantity based on the first indication information, that is, determine the first code modulation symbol quantity based on a quantity of REs occupied by an ACK/a NACK that the terminal device actually needs to feed back, thereby improving accuracy of the first code modulation symbol quantity.

In a possible implementation, by indicating a quantity of PDSCHs that the terminal device needs to feed back, the first indication information indicates the quantity of code modulation symbols occupied for transmitting the ACK/NACK on the PUSCH.

In a possible implementation, the method includes: If the first time length is less than or equal to the first preset time length, the terminal device determines the first code modulation symbol quantity based on the second code modulation symbol quantity, where the second code modulation symbol quantity is the preset quantity of code modulation symbols of the HARQ-ACK.

In this embodiment of this application, if the first time length is less than the first preset time length, the terminal device may determine the first code modulation symbol quantity based on the second code modulation symbol quantity. This helps ensure that the terminal device can determine the first code modulation symbol quantity in time.

In a possible implementation, the second code modulation symbol quantity is determined based on at least one of the following information: a quantity of carriers that are able to be simultaneously used or activated by the terminal device; subframe configuration or timeslot configuration of the terminal device, that is, configuration of uplink and downlink symbols in a subframe or a timeslot; a quantity of downlink data channels scheduled by the terminal device; or K1 configured for the terminal device or an RRC parameter set corresponding to K1, where K1 is used to indicate a delay between sending of a PDSCH and a HARQ feedback.

In this embodiment of this application, the second code modulation symbol quantity is determined based on information about the terminal device. This helps make the preset second code modulation symbols quantity closer to an actual code modulation symbol quantity of the ACK/NACK.

In a possible implementation, the second code modulation symbol quantity may be alternatively configured as a quantity of REs corresponding to HARQ information of X bits, where X may be 1 or 2, to simplify a configuration process of the second code modulation symbol quantity.

In a possible implementation, the first preset time length is determined based on a subcarrier spacing of a BWP on which the PUSCH is located or a subcarrier spacing of a carrier on which the PUSCH is located.

In a possible implementation, the first code modulation symbol quantity is determined based on a quantity of first resource elements and a quantity of second resource elements, the quantity of first resource elements is a quantity of resource elements occupied by uplink control information in all OFDM symbols occupied by the PUSCH, and the quantity of second resource elements is a quantity, estimated based on a transmission parameter of the PUSCH, of resource elements occupied by the CSI-1.

In this embodiment of this application, the first code modulation symbol quantity is directly determined based on the quantity of first resource elements and the quantity of second resource elements. The terminal device may not consider the quantity of code modulation symbols occupied by the ACK/NACK. This simplifies a process in which the terminal device determines the first code modulation symbol quantity, and avoids a case in which the terminal device is unable to calculate transmit power in time because the terminal device cannot learn of the quantity of code modulation symbols occupied by the ACK/NACK.

In a possible implementation, the method includes: The terminal device determines a second receiving moment for receiving second indication information, where the second indication information is used to indicate a quantity of code modulation symbols occupied for transmitting an ACK on a PDSCH; or the terminal device determines a second time length between the second receiving moment and a second sending moment, where the second sending moment is a sending moment of the PUSCH, or a sending moment of a PUCCH that at least partially overlaps the PUSCH in time domain; and if the second time length is longer than a second preset time length, the terminal device determines the first code modulation symbol quantity based on the second indication information, where a second code modulation symbol quantity is a preset quantity of code modulation symbols of a HARQ-ACK.

In this embodiment of this application, if the second time length is greater than the second preset time length, the terminal device may determine the first code modulation symbol quantity based on the second indication information, that is, determine the first code modulation symbol quantity based on a quantity of REs occupied by an ACK/a NACK that the terminal device actually needs to feed back, thereby improving accuracy of the first code modulation symbol quantity.

In a possible implementation, by indicating a quantity of PDSCHs that the terminal device needs to feed back, the second indication information indicates a quantity of code modulation symbols occupied for transmitting an ACK/a NACK on the PUSCH.

In a possible implementation, the method includes: If the second time length is less than or equal to the second preset time length, the terminal device determines the first code modulation symbol quantity based on the quantity of second resource elements and a quantity of third resource elements.

In this embodiment of this application, if the second time length is less than the second preset time length, the terminal device may determine the first code modulation symbol quantity based on the second code modulation symbol quantity. This helps ensure that the terminal device can determine the first code modulation symbol quantity in time.

In a possible implementation, the second preset time length is determined based on a subcarrier spacing of a BWP on which the PUSCH is located or a subcarrier spacing of a carrier on which the PUSCH is located.

In a possible implementation, the first preset time length and/or the second preset time length may alternatively be indicated by a network device to the terminal device. Specifically, the network device may indicate the first preset time length and/or the second preset time length to the terminal device by using physical layer signaling (for example, DCI or a MAC CE) or higher layer signaling (for example, RRC signaling).

According to a second aspect, a method for determining transmit power is provided, including: A network device determines a preset time length, where the preset time length is used to indicate a time required by a terminal device to calculate transmit power of a PUSCH; and the network device sends the preset time length to the terminal device.

In a possible implementation, the preset time length is determined based on a subcarrier spacing of a BWP on which the PUSCH is located or a subcarrier spacing of a carrier on which the PUSCH is located.

In a possible implementation, the network device may indicate the preset time length to the terminal device by using physical layer signaling (for example, DCI) or higher layer signaling (for example, RRC signaling or a MAC CE).

According to a third aspect, a method for determining transmit power is provided, including: A network device sends indication information to a terminal device, where the indication information is used to indicate a quantity of code modulation symbols occupied for transmitting an ACK on a PUSCH by the terminal device.

According to a fourth aspect, a terminal device is provided. The terminal device includes all units configured to perform method steps of the terminal device in the foregoing aspects.

According to a fifth aspect, a network device is provided. The network device includes all units configured to perform method steps of the network device in the foregoing aspects.

According to a sixth aspect, a terminal device is provided. The terminal device can implement functions of the terminal device in the method designs in the first aspect. These functions may be implemented by hardware, or may be implemented by hardware by executing corresponding software. The hardware or the software includes one or more units corresponding to the functions.

According to a seventh aspect, a network device is provided. The network device can implement functions of the network device in the method designs in the second aspect. These functions may be implemented by hardware, or may be implemented by hardware by executing corresponding software. The hardware or the software includes one or more units corresponding to the functions.

According to an eighth aspect, a terminal device is provided, including a transceiver, a processor, and a memory. The processor is configured to control the transceiver to send and receive a signal, and the memory is configured to store a computer program. The processor is configured to invoke the computer program from the memory and run the computer program, to enable the terminal device to perform the method in the first aspect.

According to a ninth aspect, a network device is provided, including a transceiver, a processor, and a memory. The processor is configured to control the transceiver to send and receive a signal, and the memory is configured to store a computer program. The processor is configured to invoke the computer program from the memory and run the computer program, to enable the network device to perform the method in the second aspect.

According to a tenth aspect, a computer program product is provided. The computer program product includes computer program code. When the computer program code is run on a computer, the computer is enabled to perform the methods in the foregoing aspects.

It should be noted that all or a part of the foregoing computer program code may be stored on a first storage medium. The first storage medium may be packaged together with a processor, or may be packaged separately from a processor. This is not specifically limited in the embodiments of this application.

According to an eleventh aspect, a computer-readable medium is provided, and the computer-readable medium stores program code. When the computer program code is run on a computer, the computer is enabled to perform the methods in the foregoing aspects.

According to a twelfth aspect, a chip system is provided. The chip system includes a processor, used by a terminal device to implement functions in the foregoing aspects, for example, generating, receiving, sending, or processing data and/or information in the foregoing methods. In a possible design, the chip system further includes a memory. The memory is configured to store a program instruction and data that am necessary for the terminal device. The chip system may include a chip, or may include a chip and another discrete device.

According to a thirteenth aspect, a chip system is provided. The chip system includes a processor, configured to support a network device in implementing functions in the foregoing aspects, for example, generating, receiving, sending, or processing data and/or information in the foregoing methods. In a possible design, the chip system further includes a memory. The memory is configured to store a program instruction and data that are necessary for the network device. The chip system may include a chip, or may include a chip and another discrete device.

DESCRIPTION OF EMBODIMENTS

The following describes technical solutions of this application with reference to accompanying drawings.

Figure 1:
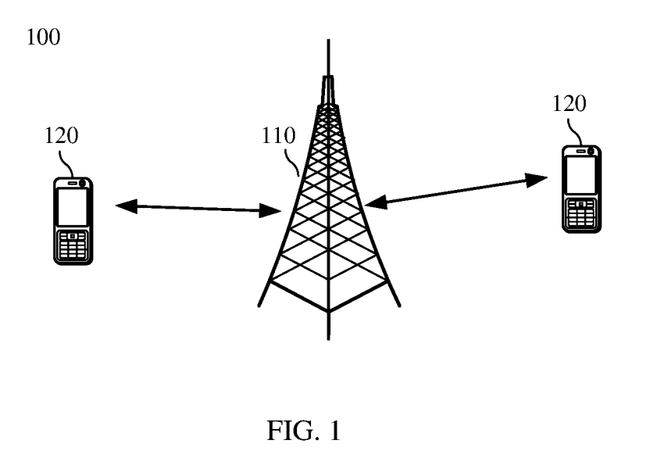
FIG. 1 shows a wireless communications system 100 to which an embodiment of this application is applied.

FIG. 1 shows a wireless communications system 100 to which an embodiment of this application is applied. The wireless communications system 100 may include a network device 110. The network device 110 may be a device that communicates with a terminal device 120. The network device 110 may provide communication coverage for a particular geographic area, and may communicate with a terminal device located in the coverage area.

FIG. 1 shows one network device and two terminals as an example. Optionally, the wireless communications system 100 may include a plurality of network devices, and a coverage area of each network device may include another quantity of terminals. This is not limited in this embodiment of this application.

Optionally, the wireless communications system 100 may further include another network entity such as a network controller or a mobility management entity. This is not limited in this embodiment of this application.

The communications system may be a global system for mobile communications (GSM), a code division multiple access (CDMA) system, a wideband code division multiple access (WCDMA) system, a general packet radio service (general packet radio service, GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

The terminal device may be a mobile station (MS), a mobile terminal, a mobile telephone, user equipment (UE), a handset, portable equipment, and the like. The terminal device may communicate with one or more core networks through a radio access network (RAN). For example, the terminal device may be a mobile telephone (or referred to as a "cellular" telephone), or a computer having a wireless communication function, or the like. The terminal device may alternatively be a portable, pocket-sized, handheld, computer built-in, or in-vehicle mobile apparatus. The terminal device may alternatively be a terminal device in a future 5G network, a terminal device in a future evolved public land mobile network (PLMN), or the like. This is not limited in this embodiment of this application.

The network device may be a device configured to communicate with the terminal device. The network device may be a base station in a GSM system or CDMA, or a NodeB (NB) in a WCDMA system, or an evolved NodeB (eNB or eNodeB) in an LTE system, or a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in this embodiment of this application.

In this embodiment of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that process a service by using a process (process), for example, a Linux operating system, a Unix operating system, an Android operating system, an iOS operating system, or a Windows operating system. The application layer includes applications such as a browser, an address book, word processing software, and instant messaging software. In addition, the embodiments of this application do not particularly limit a specific structure of an execution body of the method provided in the embodiments of this application, provided that a program recording code of the method provided in the embodiments of this application can be run to implement communication according to the method provided in the embodiments of this application. For example, the execution body of the method provided in the embodiments of this application may be the terminal device or the network device, or may be a functional module in the terminal device or the network device and capable of invoking and executing a program.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD), a digital versatile disc (DVD), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are used to store information. The term "machine-readable media" may include but is not limited to a radio channel, and various other media that can store, contain, and/or carry an instruction and/or data.

To facilitate understanding of the method in the embodiments of this application, nouns related to the embodiments of this application are first described.

1. Uplink control information UCI usually includes channel state information (Channel State Information, CSI), HARQ feedback information (which is also referred to as an ACK/a NACK), an SR, and the like.

The channel state information may specifically include CSI part 1 (CSI part 1, CSI-1) and CSI part 2 (CSI part 2, CSI-2). CSI-1 includes a CQI and an RI/a CRI for a first code word encoded by using a Type I codebook, an RI and a CQI encoded by using a Type codebook, and the like. CSI-2 includes a precoding matrix indicator (precoding matrix indicator, PMI) and a channel quality indicator (channel quality indicator, CQI) for a second code word encoded by using the Type I codebook, and a PMI encoded by using a Type II codebook. The HARQ feedback information corresponds to a PDSCH, and ACK/NACK information is fed back by transport block (transport block, TB) or code block group (code block group, CBG).

It should be noted that the uplink control information may be various combinations of the foregoing information.

2. Calculation formula for determining a power adjustment parameter

For a PUSCH that does not carry data but carries only CSI transmission, a power adjustment parameter $\Delta_{TF}$ may be determined by using the following formula:

$$\Delta_{TF,b,f,c}(i) = 10\log_{10}\left(2^{BPRE \cdot K_s} - 1\right) \cdot \beta_{offset}^{PUSCH}, \text{ where}$$

$$BPRE = \frac{O_{CSI}}{N_{RE}},$$

$O_{CSI}$ indicates a bit quantity of CSI part 1 carried on the PUSCH, $N_{RE}$ indicates a total quantity of REs, in a symbol transmitted by the PUSCH, except a quantity of REs occupied by a demodulation reference signal (demodulation reference signal, DMRS), $\beta_{offset}^{PUSCH}$ indicates a power offset for transmitting the CSI-1 on the PUSCH; and $K_S$ indicates a modulation and coding scheme (modulation and coding scheme) level.

It can be learned from the foregoing BPRE calculation formula that one of $O_{CSI}$ and $N_{RE}$ is a parameter for the CSI-1, and the other is a parameter for the PUSCH. It can be learned that the two parameters do not match each other. Therefore, in calculated REs for transmitting the PUSCH, a quantity of bits carried in each RE is not accurate enough.

Figure 2:
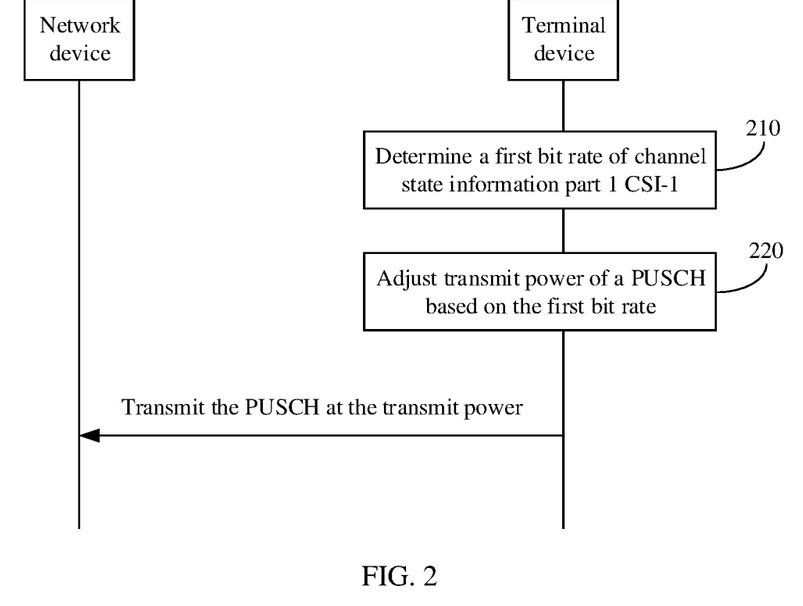
FIG. 2 is a flowchart of a method for determining transmit power according to an embodiment of this application.

To avoid the foregoing problem, this application provides a new transmit power calculation method. With reference to FIG. 2, the following describes in detail a method for determining transmit power according to an embodiment of this application. The method shown in FIG. 2 includes step 210 and step 220.

210. A terminal device determines a first bit rate of channel state information part 1 CSI-1, where the first bit rate is a bit quantity of the CSI-1 carried on each resource element for transmitting the CSI-1.

220. The terminal device adjusts transmit power of a physical uplink shared channel PUSCH based on the first bit rate, where the PUSCH is used to carry the CSI-1.

There are many methods for the terminal device to adjust the transmit power of the PUSCH based on the first bit rate. For example, the first bit rate may be proportional to the transmit power of the PUSCH, in other words, when the first bit rate increases, the terminal device may adjust the transmit power of the PUSCH based on a ratio of the first bit rate to the transmit power of the PUSCH. For another example, the terminal device may use the first bit rate as a value of the BPRE in the foregoing power adjustment parameter calculation formula, and then determine the transmit power of the PUSCH based on the power adjustment parameter. This is not specifically limited in this embodiment of this application.

Optionally, that the terminal device adjusts the transmit power of the PUSCH based on the first bit rate includes: The terminal device determines the BPRE based on the first bit rate, and adjusts the transmit power based on the BPRE by adjusting power spectrum density of the PUSCH.

In this embodiment of this application, the terminal device determines the transmit power of the PUSCH based on the first bit rate, where the first bit rate is the bit quantity of the CST-1 carried on each resource element for transmitting the CSI-1. This helps improve accuracy of determining the transmit power of the PUSCH by the terminal device.

Optionally, in an embodiment, step 210 includes: The terminal device determines a first code modulation symbol quantity, where the first code modulation symbol quantity is used to indicate a quantity of code modulation symbols of the CSI-1; and the terminal device determines the first bit rate based on the first code modulation symbol quantity and a bit quantity of the CSI-1 transmitted on the PUSCH.

The first code modulation symbol quantity may be understood as a quantity of REs occupied when the CSI-1 is transmitted by using the PUSCH.

That the first code modulation symbol quantity is used to indicate a quantity of code modulation symbols of the CSI-1. It may be understood that the first code modulation symbol quantity is the quantity of code modulation symbols of the CSI-1, or the first code modulation symbol quantity is estimated based on a quantity of REs (a quantity of second resource elements), occupied by uplink control information, in all orthogonal frequency division multiplexing (OFDM) symbols occupied by the PUSCH.

The following specifically describes three manners of determining the first code modulation symbol quantity. It should be noted that, to meet a current requirement on UCI encoding by using a polar code, a second code modulation symbol quantity determined in the following three manners needs to be less than a total quantity of REs that can be used to transmit the UCI encoded by using the polar code. If the second code modulation symbol quantity is greater than the total quantity of REs that can be used to transmit the UCI encoded by using the polar code, the total quantity of REs that can be used to transmit the UCI encoded by using the polar code may be directly used as the second code modulation symbol quantity.

Manner 1: A quantity of REs occupied by the CSI-1 is determined based on a quantity of REs occupied for transmitting an ACK/a NACK on the PUSCH and the second code modulation symbol quantity.

Based on the foregoing description, the UCI usually carries an ACK/a NACK in addition to the CSI-1. To ensure accuracy of the first code modulation symbol quantity, a quantity of code modulation symbols for transmitting the ACK/NACK in the UCI may be subtracted from the quantity of second resource elements.

For example, if the PUSCH carries CSI-2, the first code modulation symbol quantity $Q'_{CSI-1}$ may be determined by using a formula $$Q'_{CSI-1} = \min\left\{\left\lceil\frac{(O_{CSI-1} + L_{CSI-1})\beta^{PUSCH}_{offset}}{R \cdot Q_m}\right\rceil, \sum_{l=0}^{N^{PUSCH}_{symball}-1} M^{UCI}_{sc}(l) - Q_{ACK}\right\}.$$

If the PUSCH does not carry the CSI-2, the first code modulation symbol quantity $Q'_{CSI-1}$ may be determined by using a formula $$Q'_{CSI-1} = \sum_{l=0}^{N^{PUSCH}_{symball}-1} M^{UCI}_{sc}(l) - Q_{ACK},$$

where l=0, 1, 2, n, $N_{symb,all}^{PUSCH}-1$, $O_{CSI-1}$ indicates a quantity of bits occupied for transmitting the CSI part 1 on the PUSCH, $L_{CSI-1}$ indicates a quantity of bits of CRC included in the CSI-1, $\beta_{offset}^{PUSCH}$ indicates a power offset for transmitting the CSI part 1 on the PUSCH, R indicates an encoding rate of the PUSCH, $Q_m$ indicates a modulation order of the PUSCH, and $N_{symb,all}^{PUSCH}$ indicates a quantity of all OFDM symbols occupied by the PUSCH.

In some cases, after learning of the quantity of code modulation symbols for transmitting the ACK/NACK by using the PUSCH, the terminal device may be unable to calculate an adjustment parameter of the transmit power of the PUSCH in time. To be specific, the terminal device usually needs to determine, based on a quantity of PDSCHs that need to be received by the terminal device, the quantity of modulation symbols required for transmitting the ACK/NACK on the PUSCH, where the quantity of PDSCHs is indicated in an uplink grant. However, for a terminal device with an insufficient capability, a time period from a receiving moment of the uplink grant to a sending moment of the PUSCH (or a sending moment of a PUCCH) is insufficient for the terminal device to calculate the transmit power of the PUSCH, and therefore, the transmit power of the PUSCH cannot be adjusted. This reduces a probability that a network device correctly receives the PUSCH.

The following uses a carrier aggregation scenario as an example to describe a case in which the terminal device may be unable to learn of the quantity of code modulation symbols for transmitting the ACK/NACK on the PUSCH.

In the carrier aggregation scenario, the terminal may communicate with the network device by using PUSCHs in a plurality of carriers. When the terminal device has UCI to transmit, the UCI originally needs to be transmitted by using a PUCCH. However, the PUCCH for transmitting the UCI may overlap a part of a plurality of PUSCHs in time domain. In this case, the terminal device is configured to transmit the UCI by using a PUSCH whose carrier number is the smallest. In a possible case, after receiving an uplink grant (UL grant), and before sending the UCI by using the PUSCH, that is, within a time length from a first time to a second time shown in FIG. 3, the terminal device is unable to calculate the adjustment parameter of the transmit power in time based on a quantity of code modulation symbols required for sending an ACK in the UL grant. Therefore, the terminal device is unable to determine the transmit power of the PUSCH in time based on the quantity of code modulation symbols of the ACK/NACK.

To avoid a case in which the terminal device cannot calculate the transmit power of the PUSCH due to an insufficient capability, this embodiment of this application further provides two manners of calculating the first code modulation symbol quantity, that is, manner 2 and manner 3.

Manner 2: Determine the first code modulation symbol quantity based on a preset second code modulation symbol quantity.

That is, the first code modulation symbol quantity is determined based on the second code modulation symbol quantity, and the second code modulation symbol quantity is a preset quantity of code modulation symbols of a HARQ-ACK.

There may be a plurality of manners in which the terminal device determines the first code modulation symbol quantity based on the second code modulation symbol quantity. For example, the terminal device may determine the firs code modulation symbol quantity by calculating a difference between a quantity of first resource elements and the second code modulation symbol quantity. For another example, the terminal device may determine the first code modulation symbol quantity based on a difference between a quantity of first resource elements and the second code modulation symbol quantity, and a quantity of second resource elements, where the quantity of first resource elements is a quantity of resource elements occupied by uplink control information in all OFDM symbols occupied by the PUSCH, and the quantity of second resource elements is a quantity, estimated based on a transmission parameter of the PUSCH, of resource elements occupied by the CSI-1.

For example, if the PUSCH carries the CSI-2, the first code modulation symbol quantity $Q'_{CSI-1}$ may be determined by using a formula $$Q'_{CSI-1} = \min\left\{\left\lceil \frac{(O_{CSI-1} + L_{CSI-1})\beta_{offset}^{PUSCH}}{R \cdot Q_m} \right\rceil, \sum_{l=0}^{N_{symball}^{PUSCH}-1} M_{sc}^{UCI}(l) - Q_{ACK}^{predefine}\right\}.$$

If the PUSCH does not carry the CSI-2, the first code modulation symbol quantity $Q'_{CSI-1}$ may be determined by using a formula $$Q'_{CSI-1} = \sum_{l=0}^{N_{symball}^{PUSCH}-1} M_{sc}^{UCI}(l) - Q_{ACK}^{predefine}, \text{ where}$$

l=0, 1, 2, n, $N_{symb,all}^{PUSCH}-1$, $O_{CSI-1}$ indicates a quantity of bits occupied for transmitting the CSI part 1 on the PUSCH, $L_{CSI-1}$ indicates transmission on the target PUSCH, $\beta_{offset}^{PUSCH}$ indicates a power offset on the PUSCH, R indicates an encoding rate of the PUSCH, $Q_m$ indicates a modulation order of the PUSCH, and $N_{symb,all}^{PUSCH}$ indicates a quantity of all OFDM symbols occupied by the PUSCH.

It should be noted that, $$\left\lceil \frac{(O_{CSI-1} + L_{CSI-1})\beta_{offset}^{PUSCH}}{R \cdot Q_m} \right\rceil$$

in the foregoing formula may be understood as a specific implementation of the quantity, estimated based on the transmission parameter of the PUSCH, of resource elements occupied by the CSI-1 (that is, the quantity of second resource elements).

Optionally, the preset second code modulation symbol quantity may be determined for the terminal device based on a current transmission parameter of the terminal device. For example, the second code modulation symbol quantity may be determined based on at least one of the following information: a quantity of carriers that are able to be simultaneously used or activated by the terminal device; subframe configuration or timeslot configuration of the terminal device, that is, configuration of uplink and downlink symbols in a subframe or a timeslot; a quantity of downlink data channels scheduled by the terminal device; or K1 configured for the terminal device or an RRC parameter set corresponding to K1, where K1 is used to indicate a delay between sending of a PDSCH and a HARQ feedback. Certainly, the second code modulation symbol quantity may alternatively be a fixed value. For example, the second code modulation symbol quantity is directly configured as a quantity of REs occupied by a 1-bit or 2-bit ACK/NACK.

Manner 3: Directly determine the first code modulation symbol quantity based on a quantity of first resource elements.

Because a quantity of REs of an ACK/a NACK carried in UCI is less than a quantity of REs of the CSI-1 carried in the uplink control information (uplink control information, UCI), when calculating the quantity of REs of the CSI-1 (or the first code modulation symbol quantity), the terminal device may directly use the quantity of first resource elements as the quantity of REs of the CSI-1, that is, the manner in which the terminal device determines the first code modulation symbol quantity based on the quantity of first resource elements may include directly using the quantity of first resource elements as the first code modulation symbol quantity.

Alternatively, the manner in which the terminal device determines the first code modulation symbol quantity based on the quantity of first resource elements may further include: The terminal device determines the first code modulation symbol quantity based on the quantity of first resource elements and a quantity of second resource elements, where the quantity of first resource elements is a quantity of resource elements occupied by uplink control information in all OFDM symbols occupied by the PUSCH, and the quantity of second resource elements is a quantity, estimated based on a transmission parameter of the PUSCH, of resource elements occupied by the CSI-1.

For example, if the PUSCH carries the CSI-2, the first code modulation symbol quantity $Q'_{CSI-1}$ may be determined by using a formula $$Q'_{CSI-1} = \min\left\{\left\lceil \frac{(O_{CSI-1} + L_{CSI-1})\beta_{offset}^{PUSCH}}{R \cdot Q_m} \right\rceil, \sum_{l=0}^{N_{symball}^{PUSCH}-1} M_{sc}^{UCI}(l)\right\}.$$

If the PUSCH does not carry the CSI-2, the first code modulation symbol quantity $Q'_{CSI-1}$ may be determined by using a formula $$Q'_{CSI-1} = \sum_{l=0}^{N_{symball}^{PUSCH}-1} M_{sc}^{UCI}(l),$$

where
l=0, 1, 2, n, $N_{symb,all}^{PUSCH}-1$, $O_{CSI-1}$ indicates a quantity of bits occupied for transmitting the CSI-1 on the PUSCH, $L_{CSI-1}$ indicates a quantity of bits of CRC included in the CSI-1, $\beta_{offset}^{PUSCH}$ indicates a power offset for transmitting the CSI part 1 on the PUSCH, R indicates an encoding rate of the PUSCH, $Q_m$ indicates a modulation order of the PUSCH, and $N_{symb,all}^{PUSCH}$ indicates a quantity of all OFDM symbols occupied by the PUSCH.

It should be noted that, $$\left\lceil \frac{(O_{CSI-1} + L_{CSI-1})\beta_{offset}^{PUSCH}}{R \cdot Q_m} \right\rceil$$

in the foregoing formula may be understood as a specific implementation of the quantity, estimated based on the transmission parameter of the PUSCH, of resource elements occupied by the CSI-1 (that is, the quantity of second resource elements).

Certainly, after obtaining the quantity of code modulation symbols occupied for transmitting the ACK/NACK on the PUSCH, if the terminal device can determine the transmit power of the PUSCH before sending the PUSCH, the terminal device may determine the first code modulation symbol quantity based on the quantity of code modulation symbols occupied for transmitting the ACK/NACK on the PUSCH, to adjust the transmit power of the PUSCH, even if the first code modulation symbol quantity is determined in manner 1. In this way, precision of the adjusted transmit power of the PUSCH is higher. After obtaining the quantity of code modulation symbols occupied for transmitting the ACK/NACK on the PUSCH, if the terminal device is unable to determine the transmit power of the PUSCH in time before sending the PUSCH, the terminal device may determine the first code modulation symbol quantity in manner 2 or manner 3.

That is, the terminal device determines a receiving moment for receiving indication information, where the indication information is used to indicate a quantity of code modulation symbols occupied for transmitting the ACK on the PUSCH; the terminal device determines a first time length from the receiving moment to a sending moment, where the sending moment is a sending moment of the PUSCH, or a sending moment of a PUCCH that at least partially overlaps the PUSCH in time domain; and if the time length is greater than a preset time length, the terminal device determines the first code modulation symbol quantity based on the indication information.

The preset time length is used to indicate a time required by the terminal device to determine the transmit power of the PUSCH. If the time length is greater than the preset time length, it indicates that the terminal device can calculate the transmit power of the PUSCH before sending the PUSCH.

It should be noted that if the time length is less than or equal to the preset time length, the terminal device may calculate the transmit power of the PUSCH in manner 2 and manner 3, or does not calculate the transmit power of the PUSCH.

That is, if the time length is less than or equal to the preset time length (including the first preset time length and the second preset time length as described above), the terminal device determines the first code modulation symbol quantity based on the quantity of the second resource elements and the quantity of the first resource elements. Alternatively, if the time length is less than or equal to the preset time length, the terminal device determines the first code modulation symbol quantity based on the second code modulation symbol quantity.

If the time length is less than or equal to the preset time length, it indicates that the terminal device is unable to determine the transmit power of the PUSCH in time based on the indication information before sending the PUSCH, or does not calculate the transmit power of the PUSCH.

Optionally, the preset time length may be determined based on a subcarrier spacing of a bandwidth part (bandwidth part, BWP) in which the PUSCH is located or a subcarrier spacing of a carrier in which the PUSCH is located. For example, a subcarrier spacing of 15 KHz is used, and the preset time length may be 10 symbols. The preset time length may alternatively be a parameter or a parameter set configured by the network device by using physical layer signaling (for example, downlink control information (DCI)) or higher layer signaling (for example, radio resource control, (RRC) signaling, or media access control element, (MAC CE)).

Optionally, a determining condition for the terminal device to select manner 1, manner 2, or manner 3 to determine the first code modulation symbol quantity may be comparison between a third time length and the preset time length, where the third time length ranges from the last symbol of a PDSCH received by the terminal device to the sending moment of the foregoing PUSCH (or PUCCH). If the third time length is less than or equal to the preset time length, the terminal device calculates the first code modulation symbol quantity in manner 2 and manner 3, or does not calculate the transmit power of the PUSCH. If the third time length is greater than the preset time length, the terminal device calculates the first code modulation symbol quantity in manner 1.

Optionally, the indication information may be an uplink grant. The terminal device may determine, based on a quantity of PDSCHs that need to be received by the terminal device, the quantity of code modulation symbols required for transmitting the ACK/NACK on the PUSCH, where the quantity of PDSCHs is indicated in the uplink grant.

Figure 3:
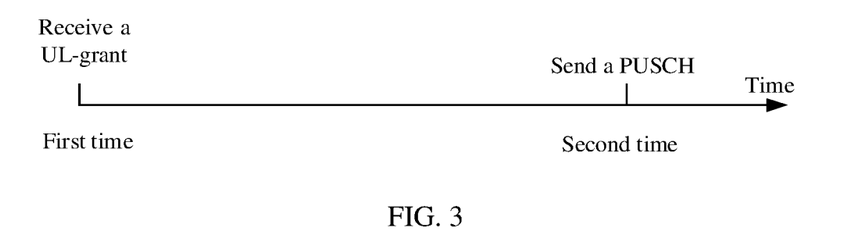
FIG. 3 is a schematic diagram of a timeline for sending a PUSCH by a terminal device according to an embodiment of this application.

The foregoing describes in detail the method for determining transmit power in the embodiments of this application with reference to FIG. 1 to FIG. 3. The following describes in detail apparatuses in the embodiments of this application with reference to FIG. 4 to FIG. 7. It should be understood that the apparatuses shown in FIG. 4 to FIG. 7 can implement one or more steps in the method procedure shown in FIG. 2. To avoid repetition, details are not described herein again.

Figure 4:
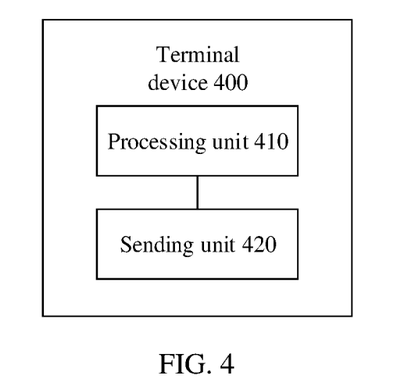
FIG. 4 is a schematic block diagram of a terminal device according to an embodiment of this application.

FIG. 4 is a schematic diagram of a terminal device according to an embodiment of this application. A terminal device 400 shown in FIG. 4 includes a processing unit 410 and a sending unit 420. The sending unit 420 may be configured to perform the step of sending the PUSCH to the network device shown in FIG. 2.

In a possible implementation, the terminal device 400 may be configured to perform the method step performed by the terminal device in the method shown in FIG. 3, that is, the processing unit 410 performs step 210 and step 220. It should be noted that, the processing unit 410 may be further configured to perform steps other than sending and receiving in the method embodiment in the foregoing figure. For details, refer to related descriptions in the foregoing method embodiment. Details are not described herein.

In an optional embodiment, the processing unit 410 may be a processor 520, and the sending unit 420 may be a transceiver 540. A terminal device 500 may further include an input/output interface 530 and a memory 510, which are specifically shown in FIG. 5.

Figure 5:
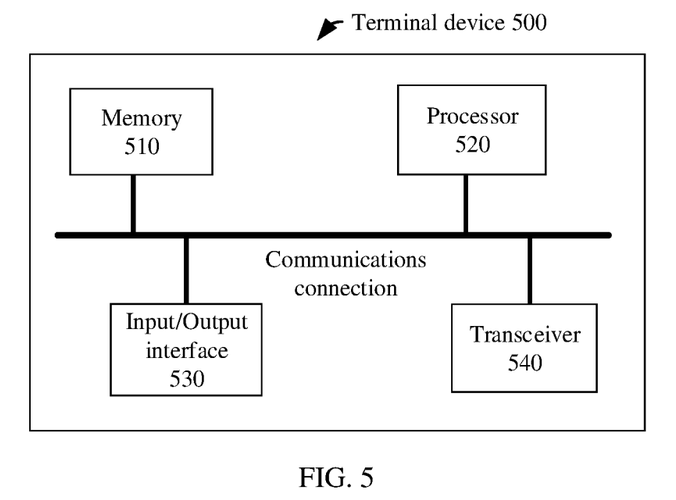
FIG. 5 is a schematic block diagram of a terminal device according to another embodiment of this application.

FIG. 5 is a schematic block diagram of a terminal device according to another embodiment of this application. The terminal device 500 shown in FIG. 5 may include the memory 510, the processor 520, the input/output interface 530, and the transceiver 540. The memory 510, the processor 520, the input/output interface 530, and the transceiver

540 are connected by using an internal connection path. The memory 510 is configured to store an instruction. The processor 520 is configured to execute the instruction stored in the memory 520, to control the input/output interface 530 to receive input data and information, output data such as an operation result, and the like, and to control the transceiver 540 to send a signal.

In an implementation process, the steps in the foregoing methods can be implemented by using a hardware integrated logical circuit in the processor 520, or by using instructions in a form of software. The methods disclosed with reference to the embodiments of this application may be directly performed by a hardware processor, or may be performed by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in the memory 510, and the processor 520 reads information from the memory 510 and completes the steps in the foregoing methods in combination with hardware of the processor. To avoid repetition, details are not described herein again.

Figure 6:
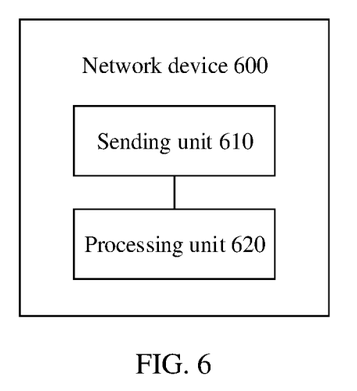
FIG. 6 is a schematic diagram of a network device according to an embodiment of this application.

FIG. 6 is a schematic diagram of a network device according to an embodiment of this application. A network device 600 shown in FIG. 6 includes a sending unit 610 and a receiving unit 620.

In a possible implementation, the network device 600 may be configured to perform the method step performed by the network device in the method shown in FIG. 3, that is, the sending unit 610 may be configured to send indication information to a terminal device, or be configured to indicate the foregoing preset time length to the terminal device. The network device may further include a processing unit, and the processing unit is configured to determine the foregoing preset time length. It should be noted that, the processing unit may be further configured to perform steps other than sending and receiving in the method embodiment in the foregoing figure. For details, refer to related descriptions in the foregoing method embodiment. Details are not described herein.

In an optional embodiment, the sending unit 610 and the receiving unit 620 may be a transceiver 740, and the processing unit may be a processor 720. A network device 700 may further include an input/output interface 730 and a memory 710, which are specifically shown in FIG. 7.

Figure 7:
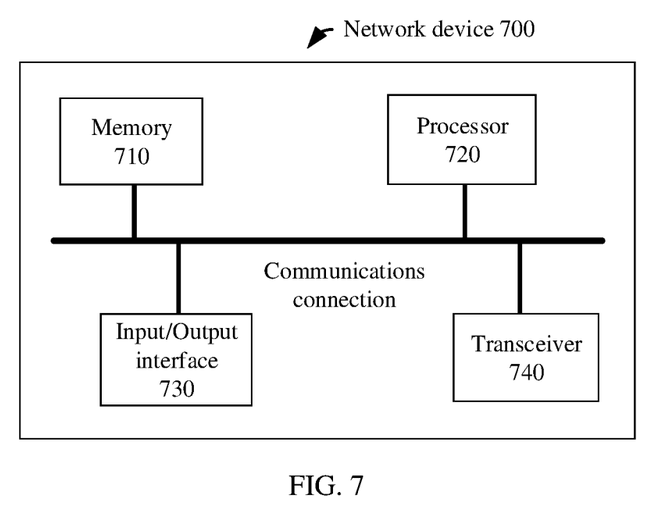
FIG. 7 is a schematic block diagram of a network device according to another embodiment of this application.

FIG. 7 is a schematic block diagram of a network device according to another embodiment of this application. The network device 700 shown in FIG. 7 may include the memory 710, the processor 720, the input/output interface 730, and the transceiver 740. The memory 710, the processor 720, the input/output interface 730, and the transceiver 740 are connected by using an internal connection path. The memory 710 is configured to store an instruction. The processor 720 is configured to execute the instruction stored in the memory 720, to control the input/output interface 730 to receive input data and information, output data such as an operation result, and the like, and to control the transceiver 740 to send a signal.

In an implementation process, the steps in the foregoing methods can be implemented by using a hardware integrated logical circuit in the processor 720, or an instruction in a form of software. The methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 710. The processor 720 reads information from the memory 710 and completes the steps in the foregoing methods in combination with hardware of the processor. To avoid repetition, details are not described herein again.

It should be understood that, the processor in the embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be understood that, in this embodiment of this application, the transceiver is also referred to as a communications interface, and uses a transceiver apparatus that may be but is not limited to a transceiver, to implement communication between a communications device (for example, a terminal device or a network device) and another device or a communications network.

It should also be understood that in the embodiments of this application, the memory may include a read-only memory and a random access memory, and provide an instruction and data to the processor. The processor may further include a non-volatile random access memory. For example, the processor may further store information about a device type.

It should be understood that in the embodiments of this application, "B corresponding to A" indicates that B is associated with A, and B may be determined according to A. However, it should further be understood that determining A according to B does not mean that B is determined only according to A; that is, B may also be determined according to A and/or other information.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of this application. The execution sequences of the processes shall be determined according to functions and internal logic of the processes, but shall not be construed as any limitation on the implementation processes of the embodiments of this application.

In the several embodiments provided in this application, it should be understood that the disclosed system, apparatus, and method may be implemented in other manners. For example, the described apparatus embodiments am merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state disk (solid state disk, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining transmit power, comprising:
    determining, by a terminal device, a first bit rate of channel state information part 1 (CSI-1), wherein the first bit rate is a bit quantity of the CSI-1 carried on each resource element for transmitting the CSI-1; and
    adjusting, by the terminal device, transmit power of a physical uplink shared channel (PUSCH) based on the first bit rate, wherein the PUSCH is used to carry the CSI-1;
    wherein the determining, by a terminal device, a first bit rate of channel state information part 1 CSI-1 comprises:
    determining, by the terminal device according to quantity of first resource elements and a quantity of second resource elements, a first code modulation symbol quantity, wherein the first code modulation symbol quantity is used to indicate a quantity of code modulation symbols of the CSI-1 and the quantity of first resource elements is a quantity of resource elements occupied by uplink control information in all OFDM symbols occupied by the PUSCH; and the quantity of second resource elements is a quantity, estimated based on a transmission parameter of the PUSCH, of resource elements occupied by the CSI-1; and
    determining, by the terminal device, the first bit rate based on the first code modulation symbol quantity and a bit quantity of the CSI-1 transmitted on the PUSCH;
    wherein the method further comprises:
    determining, by the terminal device, a second receiving moment for receiving second indication information, wherein the second indication information is used to indicate a quantity of code modulation symbols occupied for transmitting an ACK/NACK on the PUSCH;
    determining, by the terminal device, a second time length between the second receiving moment and a second sending moment, wherein the second sending moment is a sending moment of the PUSCH, or a sending moment of a PUCCH that at least partially overlaps the PUSCH in time domain; and
    determining the second time length is greater than a second preset time length, in response to determining the second time length is greater than the second preset time length, determining, by the terminal device, the first code modulation symbol quantity based on the second indication information, wherein a second code modulation symbol quantity is a preset quantity of code modulation symbols of a HARQ-ACK.

2. The method according to claim 1, wherein the first code modulation symbol quantity is the quantity of code modulation symbols of the CSI-1.

3. The method according to claim 2, wherein the first code modulation symbol quantity is determined based on the second code modulation symbol quantity, and the second code modulation symbol quantity is a preset quantity of code modulation symbols of a HARQ-ACK.

4. The method according to claim 3, wherein the first code modulation symbol quantity is determined based on the second code modulation symbol quantity and the quantity of first resource elements, and the quantity of first resource elements is a quantity of resource elements occupied by uplink control information in all OFDM symbols occupied by the PUSCH.

5. The method according to claim 3, wherein the second code modulation symbol quantity is determined based on at least one of the following:
    a quantity of carriers that are able to be simultaneously used by the terminal device;
    subframe configuration or timeslot configuration of the terminal device;
    a quantity of downlink data channels scheduled by the terminal device; and
    K1 configured for the terminal device, or a radio resource control RRC parameter set corresponding to K1, wherein K1 is used to indicate a delay between sending of a physical downlink shared channel PDSCH and a HARQ feedback.

6. A power determining apparatus, comprising:
    a processor and a non-transitory memory storing program instructions;
    wherein when executed by the processor, the program instructions enable the data transmission device to perform the following steps:

determining a first bit rate of channel state information part 1 (CSI-1), wherein the first bit rate is a bit quantity of the CSI-1 carried on each resource element for transmitting the CSI-1; and adjusting transmit power of a physical uplink shared channel (PUSCH) based on the first bit rate, wherein the PUSCH is used to carry the CSI-1;

wherein the determining a first bit rate of channel state information part 1 CSI-1 comprises:

determining, according to quantity of first resource elements and a quantity of second resource elements, a first code modulation symbol quantity, wherein the first code modulation symbol quantity is used to indicate a quantity of code modulation symbols of the CSI-1 and the quantity of first resource elements is a quantity of resource elements occupied by uplink control information in all OFDM symbols occupied by the PUSCH; and the quantity of second resource elements is a quantity, estimated based on a transmission parameter of the PUSCH, of resource elements occupied by the CSI-1; and determining the first bit rate based on the first code modulation symbol quantity and a bit quantity of the CSI-1 transmitted on the PUSCH;

wherein the apparatus is further enabled to perform the step of:

determining a second receiving moment for receiving second indication information, wherein the second indication information is used to indicate a quantity of code modulation symbols occupied for transmitting an ACK on the PUSCH;

determining a second time length between the second receiving moment and a second sending moment, wherein the second sending moment is a sending moment of the PUSCH, or a sending moment of a PUCCH that at least partially overlaps the PUSCH in time domain; and determining the second time length is greater than a second preset time length, when it is determined that the second time length is greater than the second preset time length, determining the first code modulation symbol quantity based on the second indication information, wherein a second code modulation symbol quantity is a preset quantity of code modulation symbols of a HARQ-ACK.

7. The apparatus according to claim 6, wherein the first code modulation symbol quantity is the quantity of code modulation symbols of the CSI-1.

8. The apparatus according to claim 7, wherein the first code modulation symbol quantity is determined based on the second code modulation symbol quantity, and the second code modulation symbol quantity is a preset quantity of code modulation symbols of a HARQ-ACK.

9. The apparatus according to claim 8, wherein the first code modulation symbol quantity is determined based on the second code modulation symbol quantity and the quantity of first resource elements, and the quantity of first resource elements is a quantity of resource elements occupied by uplink control information in all OFDM symbols occupied by the PUSCH.

10. The apparatus according to claim 8, wherein the second code modulation symbol quantity is determined based on at least one of the following:

a quantity of carriers that are able to be simultaneously used by the apparatus;

subframe configuration of the apparatus;

a quantity of scheduled downlink data channels received by the apparatus; and a radio resource control RRC parameter set corresponding to K1 of the apparatus, wherein K1 is used to indicate a delay between sending of a PDSCH sending and a HARQ feedback.

11. A non-transitory computer-readable medium having processor-executable instructions stored thereon, the processor-executable instructions, when executed, facilitate performance of a power determining method comprising:

determining a first bit rate of channel state information part 1 (CSI-1), wherein the first bit rate is a bit quantity of the CSI-1 carried on each resource element for transmitting the CSI-1; and adjusting transmit power of a physical uplink shared channel (PUSCH) based on the first bit rate, wherein the PUSCH is used to carry the CSI-1;

wherein the determining a first bit rate of channel state information part 1 CSI-1 comprises:

determining, according to quantity of first resource elements and a quantity of second resource elements, a first code modulation symbol quantity, wherein the first code modulation symbol quantity is used to indicate a quantity of code modulation symbols of the CSI-1 and the quantity of first resource elements is a quantity of resource elements occupied by uplink control information in all OFDM symbols occupied by the PUSCH; and the quantity of second resource elements is a quantity, estimated based on a transmission parameter of the PUSCH, of resource elements occupied by the CSI-1; and determining the first bit rate based on the first code modulation symbol quantity and a bit quantity of the CSI-1 transmitted on the PUSCH;

wherein the method further comprises:

determining a second receiving moment for receiving second indication information, wherein the second indication information is used to indicate a quantity of code modulation symbols occupied for transmitting an ACK on the PUSCH;

determining a second time length between the second receiving moment and a second sending moment, wherein the second sending moment is a sending moment of the PUSCH, or a sending moment of a PUCCH that at least partially overlaps the PUSCH in time domain; and determining the second time length is greater than a second preset time length, when it is determined that the second time length is greater than the second preset time length, determining the first code modulation symbol quantity based on the second indication information, wherein a second code modulation symbol quantity is a preset quantity of code modulation symbols of a HARQ-ACK.

12. The non-transitory computer-readable medium according to claim 11, wherein the first code modulation symbol quantity is the quantity of code modulation symbols of the CSI-1.

13. The non-transitory computer-readable medium according to claim 12, wherein the first code modulation symbol quantity is determined based on the second code modulation symbol quantity, and the second code modulation symbol quantity is a preset quantity of code modulation symbols of a HARQ-ACK.

* * * * *